(12) United States Patent
Rother et al.

(10) Patent No.: US 12,196,384 B2
(45) Date of Patent: Jan. 14, 2025

(54) DECORATIVE COVER ELEMENT FOR A MOTOR VEHICLE, AND VEHICLE HAVING SUCH A COVER ELEMENT

(71) Applicant: Bayerische Motoren Werke Aktiengesellschaft, Munich (DE)

(72) Inventors: Bernhard Rother, Grosskarolinenfeld (DE); Martin Schneebauer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/568,479

(22) PCT Filed: Jun. 13, 2022

(86) PCT No.: PCT/EP2022/066036
§ 371 (c)(1),
(2) Date: Dec. 8, 2023

(87) PCT Pub. No.: WO2023/274703
PCT Pub. Date: Jan. 5, 2023

(65) Prior Publication Data
US 2024/0288141 A1 Aug. 29, 2024

(30) Foreign Application Priority Data
Jun. 30, 2021 (DE) .................... 10 2021 116 808.2

(51) Int. Cl.
*F21S 41/50* (2018.01)
*B60R 19/52* (2006.01)
(Continued)

(52) U.S. Cl.
CPC .............. *F21S 41/50* (2018.01); *B60R 19/52* (2013.01); *F21S 41/24* (2018.01); *F21S 41/2805* (2024.05); *B60R 2019/525* (2013.01)

(58) Field of Classification Search
None
See application file for complete search history.

(56) References Cited

U.S. PATENT DOCUMENTS

| 2004/0007898 | A1 | 1/2004 | Pommeret et al. |
| 2013/0182450 | A1 | 7/2013 | Buisson |
| 2022/0221121 | A1* | 7/2022 | Hwang .................. F21S 43/19 |

FOREIGN PATENT DOCUMENTS

| CN | 221457552 U | * 8/2024 | .......... B60Q 1/0035 |
| DE | 200 16 898 U1 | 2/2001 | |

(Continued)

OTHER PUBLICATIONS

International Search Report (PCT/ISA/210) issued in PCT Application No. PCT/EP2022/066036 dated Sep. 5, 2022 with English translation (6 pages).
(Continued)

*Primary Examiner* — Mariceli Santiago
(74) *Attorney, Agent, or Firm* — Crowell & Moring LLP

(57) ABSTRACT

A decorative cover element for a headlight of a vehicle includes a translucent element, a partially transparent element, and a light-guiding element. The translucent element, in the installed state, forms an outer skin of the vehicle and a safeguard for the headlight. The partially transparent element has translucent sections and opaque sections. The light-guiding element is designed to decouple coupled-in light at least in sections in the direction of the translucent element. The partially transparent element is arranged between the translucent element and the light-guiding element. In the installed state, the translucent sections and the opaque sections of the partially transparent element are at least partially arranged adjacent to the headlight.

17 Claims, 5 Drawing Sheets

(51) Int. Cl.
*F21S 41/20* (2018.01)
*F21S 41/24* (2018.01)

(56) References Cited

FOREIGN PATENT DOCUMENTS

| | | |
|---|---|---|
| DE | 10 2011 015 012 A1 | 9/2012 |
| DE | 10 2019 211 504 A1 | 2/2021 |
| DE | 10 2019 211 845 A1 | 2/2021 |
| EP | 3 628 541 A1 | 4/2020 |
| EP | 3 686 629 A1 | 7/2020 |
| JP | 2005-82036 A | 3/2005 |
| JP | 2014-70899 A | 4/2014 |
| JP | 2015-99654 A | 5/2015 |
| WO | WO-2022199727 A1 * | 9/2022 ............... B60Q 1/28 |

OTHER PUBLICATIONS

German-language Written Opinion (PCT/ISA/237) issued in PCT Application No. PCT/EP2022/066036 dated Sep. 5, 2022 with English translation (9 pages).
German Search Report issued in German Application No. 10 2021 116 808.2 dated Apr. 14, 2022 with partial English translation (11 pages).

* cited by examiner

DECORATIVE COVER ELEMENT FOR A MOTOR VEHICLE, AND VEHICLE HAVING SUCH A COVER ELEMENT

BACKGROUND AND SUMMARY

The present disclosure relates to a decorative cover element for a headlight of a vehicle, which comprises a translucent element that forms an outer skin of the vehicle and a safeguard for the headlight in the installed state. Furthermore, the disclosure relates to a vehicle having such a decorative cover element.

Decorative cover elements in the form of decorative elements are used in the automotive area to provide a vehicle with a high-quality appearance and an individual look. Decorative elements are thus also used for the exterior of a vehicle. For example, metallic coated decorative elements are used, in which light sources, such as LEDs, are arranged directly behind the metallic coating. The decorative elements designed for the exterior are increasingly used in the area of the radiator grill of the vehicle. There is the requirement here that the decorative elements are transmissive for radar beams in order to be able to arrange a radar sensor behind the decorative element.

A decorative element for a vehicle was thus proposed by the applicant, which comprises a partially transparent element, which has translucent sections and opaque sections, and a light guiding element, which is designed to decouple coupled-in light at least in sections in the direction of the partially transparent element. The partially transparent element and the light-guiding element are transmissive for radar beams. A molding compound layer is arranged between the partially transparent element and the light-guiding element which is transmissive for the light decoupled from the light-guiding element and for radar beams and which bonds the partially transparent element and the light-guiding element to one another. The decorative element described by the applicant replaces a conventional radiator grill or a part thereof in this case.

The disclosure is based on the object of providing a decorative color element which seamlessly and monolithically enables the function of a headlight and a surface light, in particular in the area of a radiator grill. A further object is to provide a vehicle having such a cover element.

This object is achieved by a decorative cover element having the features of this disclosure. Advantageous embodiments are also the subject matter of this disclosure.

A decorative cover element for a headlight of a vehicle is proposed, which comprises a translucent element, which forms an outer skin of the vehicle and a safeguard for the headlight in the installed state, a partially transparent element, which has translucent sections and opaque sections, and a light-guiding element, which is designed to decouple coupled-in light at least in sections in the direction of the translucent element. The partially transparent element is arranged between the translucent element and the light-guiding element. In the installed state of the cover element, the translucent sections and the opaque sections of the partially transparent element are at least partially arranged adjacent to the headlight.

The decorative cover element enables the combination of a contour light and a surface light in a seamless monolithic impression. The cover element can thus not only cover the headlight, but additionally provide surface areas in which, depending on the formation of the translucent sections and the opaque sections, a light graphic is generated. These surface areas are preferably located in an area of the vehicle in which its radiator grill is typically arranged. The cover element has an appealing appearance both in the cold appearance and also while it is lighted. Because the cover element can completely replace the previously provided elements of a radiator grill and a seamless connection to the cover of the headlight is provided, in addition improved wind resistance of the vehicle is enabled, which improves the energy efficiency of the vehicle. In addition, less wind noises can be achieved in operation of the vehicle due to the seamless design because of dispensing with any joints and gaps.

The decorative cover element for the headlight of the vehicle can also be designated in the present case as a surface light having light patterns that can be individualized.

To generate an illumination function in the surface area arranged adjacent to the headlight, light is fed or coupled into the light-guiding element, wherein the light is decoupled at correspondingly provided points of the light-guiding element in the direction of the partially transparent element. The decoupled light subsequently passes through the partially transparent element and finally through the translucent element. An individual lighted appearance, such as the simulation of a radiator grill or an emblem, can be created by a corresponding arrangement of translucent sections and opaque sections.

The light-guiding element can have a coupling surface for coupling in light. The coupling surface is preferably arranged on an end face of the light-guiding element.

The partially transparent element and the light-guiding element are advantageously constructed in multiple layers. The translucent element, the partially transparent element, and the light-guiding element are expediently provided as an inseparable layered composite, wherein the layers are materially bonded to one another.

Furthermore, the translucent element, the partially transparent element, and the light-guiding element are advantageously transmissive for radar beams. If the translucent element, the partially transparent element, and the light-guiding element are formed as an inseparable layered composite, as a result of an absent air layer, the cover element has improved transmissivity for radar radiation due to a lower phase shift. The absent air layer additionally ensures a lossless light decoupling and thus an improved light guiding function.

According to an expedient embodiment, the translucent element has a first transparent layer made of a first plastic. The first plastic is advantageously made of polycarbonate (PC). The first transparent layer represents a carrier layer of the translucent element. The first transparent layer is advantageously transmissive for radar beams. The first transparent layer furthermore advantageously has an index of refraction of approximately 1.58. The first transparent layer is adapted to the shaping of the vehicle body and is created, for example, by a cutting and/or pressing process.

According to a further expedient embodiment, the translucent element has a translucent first lacquer layer, which is arranged on a surface of the translucent element facing away from the partially transparent element. The first lacquer layer forms the outer skin of the cover element. The first lacquer layer is advantageously a transparent protective lacquer layer (so-called hard coating for headlights). The first lacquer layer can thus also be designated as a protective lacquer layer. Furthermore, the first lacquer layer advantageously has an index of refraction which is less than the index of refraction of the first transparent layer. The first lacquer layer is advantageously a multicomponent lacquer system, in particular a lacquer system based on polyurethane or siloxane. Furthermore, the first lacquer layer has a layer thickness between approximately 10 μm and approximately 0.7 mm. The first lacquer layer is advantageously transmissive for radar beams.

According to a further expedient embodiment, the partially transparent element has a second transparent layer made of a second plastic. The second plastic is advantageously made of polycarbonate (PC). The second transparent layer is advantageously transmissive for radar beams. Furthermore, the second transparent layer advantageously has an index of refraction of approximately 1.58. The second transparent layer can have a layer thickness between 2.5 mm and 4.0 mm.

According to a further expedient embodiment, the partially transparent element has an opaque layer, which is arranged at least in sections on a surface of the partially transparent element facing toward the translucent element and which forms the translucent sections. Alternatively, the partially transparent element has an opaque layer which is arranged at least in sections on a surface of the partially transparent element facing away from the translucent element, which the light-guiding element adjoins and which forms the opaque sections. The opaque layer ensures that no light can pass through the first transparent layer. The opaque layer preferably does not contain any metallic or conductive components and advantageously has a layer thickness of ≤12 μm. The opaque layer can be attached or applied by printing, film application, or lacquering with subsequent laser processing. The opaque layer is advantageously transmissive for radar beams.

According to a further expedient embodiment, the partially transparent element has a third transparent layer made of a third plastic, which is arranged on a surface of the second transparent layer of the partially transparent element facing away from the translucent element. The third plastic is advantageously made of a transparent PMMA. The third transparent layer is advantageously transmissive for radar beams. The third transparent layer advantageously has a lower index of refraction than the second transparent layer. The third transparent layer advantageously has an index of refraction of approximately 1.4. The third transparent layer can be applied by lamination to the second transparent layer. The layer thickness of the third transparent layer can be between 0.01 mm and 0.2 mm. Similarly to the principle of a fiber-optic cable, a total reflection at the interface of the multilayer composite and thus low-loss light guiding is generated by the third transparent layer.

According to a further expedient embodiment, the light-guiding element has a light-guiding layer. When light is coupled into the light-guiding layer, the light beams are reflected at the inner wall of the light-guiding layer and decoupled at specific points from the light-guiding layer. The light-guiding layer advantageously directly abuts the partially transparent element. The light-guiding layer is advantageously transmissive for radar beams. Furthermore, the light-guiding layer advantageously has a thickness between approximately 2 mm and approximately 3 mm. The light-guiding layer can have an index of refraction of approximately 1.58.

According to a further expedient embodiment, the light-guiding element has a decoupling structure on a surface facing away from the partially transparent element. The decoupling structure is used to decouple the light in the direction of the partially transparent element. The decoupling structure can be provided over the entire length of the light-guiding element or in sections. The decoupling structure is advantageously opposite to the translucent sections of the partially transparent element, so that the light is decoupled toward the front and thus illuminates these areas. When light is coupled into the light-guiding layer, the light beams are reflected at the inner wall of the light-guiding element until they are incident on the decoupling structure and exit from the light-guiding layer. The decoupling structures are advantageously formed as a lacquer layer which can be applied by means of printing to the light-guiding layer. Furthermore, the light-guiding layer advantageously has the decoupling structure on a surface facing away from the partially transparent element. I.e., the decoupling structure is connected to the light-guiding layer, in particular the decoupling structure is applied to the light-guiding layer.

According to a further expedient embodiment, the light-guiding element has a fourth transparent layer made of a fourth plastic, which adjoins the decoupling structure. The fourth transparent layer is used to keep the light guiding efficient, in that the fourth transparent layer has an index of refraction which is less than the index of refraction of the light-guiding layer. The index of refraction of the fourth transparent layer is advantageously approximately 1.35. The fourth transparent layer can also be designated in the present case as a low index coating. The layer thickness of the fourth transparent layer is advantageously between 1 μm and approximately 5 μm. The fourth transparent layer is advantageously transmissive for radar beams. The fourth transparent layer can be a transparent protective lacquer layer, for example, a polyurethane lacquer or a siloxane lacquer.

According to a further expedient embodiment, the light-guiding element has a second lacquer layer, which is arranged on a surface of the fourth transparent layer facing away from the light-guiding layer. The second lacquer layer is formed as an opaque protective lacquer. The second lacquer layer advantageously has a layer thickness of approximately 30 μm. The second lacquer layer is advantageously made of polyurethane or epoxy. The second lacquer layer preferably faces toward the vehicle interior. Furthermore, the second lacquer layer is advantageously transmissive for radar beams.

According to a further expedient embodiment, the second transparent layer of the partially transparent element or the fourth transparent layer of the light-guiding element is also an electrically conductive heating layer that can be contacted by a plug connection. However, it is possible to heat the cover element in the area of the surface light, for example, to ensure the visibility of the surface light in adverse environmental conditions.

According to a further expedient embodiment, in the installed state, the headlight adjoins the first transparent layer of the translucent element. Alternatively, in the installed state of the cover element, the headlight adjoins the fourth transparent layer of the light-guiding element.

In one advantageous embodiment, a light source is provided which couples light into the light-guiding element. The light source advantageously comprises at least one light-emitting diode (LED) or an optical fiber element fed with light. Energy efficient and space-saving illumination can be generated by the use of a light-emitting diode. In one advantageous embodiment, the light source has multiple light-emitting diodes. The light-emitting diodes can advantageously have different colors which can be activated individually. The light-emitting diode can thus comprise a red, a green, and a blue light-emitting diode. Such a light-emitting diode is designated as an RGB-LED. In one advantageous embodiment, the light source has an organic light-emitting diode (OLED).

According to a further aspect, a vehicle having at least one such decorative cover element is proposed. The vehicle has a high-quality appearance due to the use of the decorative cover element, in which a headlight and a surface light replacing the radiator grill can be integrated seamlessly and monolithically into the vehicle body.

A decorative cover element, a vehicle, and further features and advantages are explained in more detail hereinafter on the basis of an exemplary embodiment of the disclosure. In the figures:

DETAILED DESCRIPTION OF THE DRAWINGS

Figure 1:
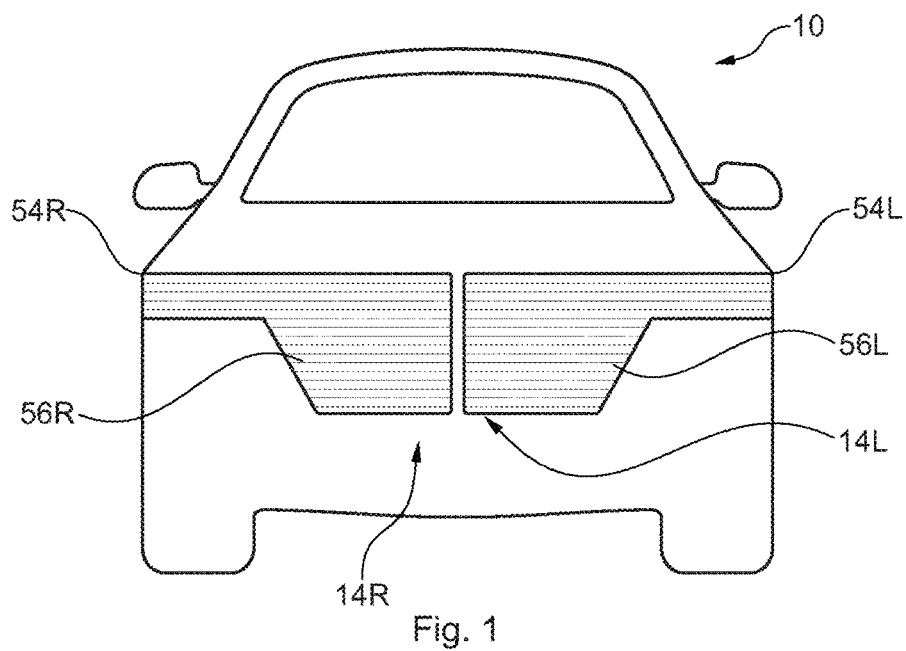
FIG. 1 shows a schematic illustration of a vehicle having two symmetrically formed decorative cover elements in the area of the vehicle front in a first operating mode.
Figure 2:
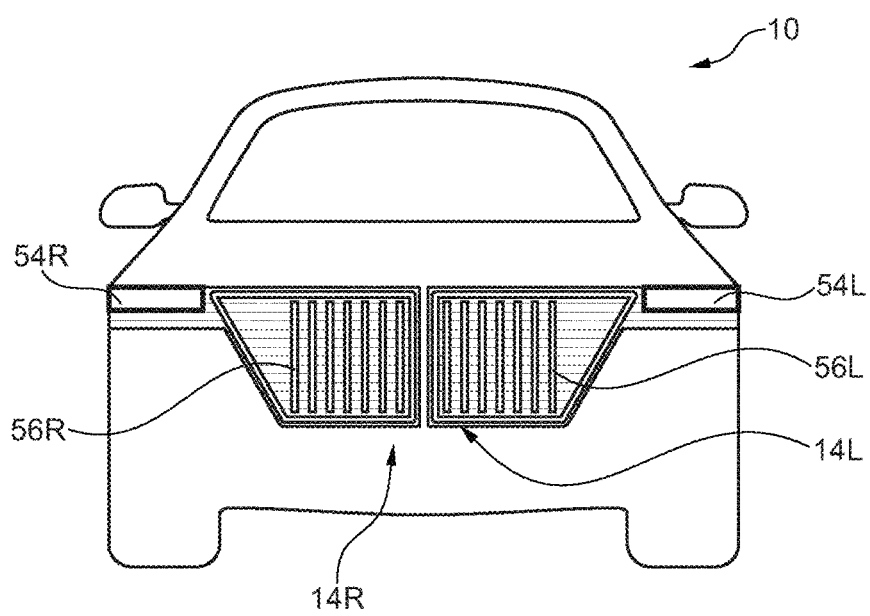
FIG. 2 shows a schematic illustration of the vehicle shown in FIG. 1 having the cover elements according to the disclosure in a second operating mode.

Each of FIGS. 1 and 2 shows a vehicle 10 in a frontal view, the exterior of which is provided with a left decorative cover element 14L and a right decorative cover element 14R. The left and the right decorative cover elements 14L, 14R are arranged mirror symmetrically with respect to a vehicle vertical axis, which is not shown in greater detail and extends from top to bottom in the sheet direction.

In the following figures, the suffix "L" appended to a reference sign designates a component of the left decorative cover element 14L. The suffix "R" appended to a reference sign designates a component of the right decorative cover element 14R. The terms "left" and "right" relate to a vehicle direction from the viewpoint of an occupant seated on a seat, whose view is directed in the direction of travel.

The left decorative cover element 14L comprises an area 54L for a left position light and an area 56L for a left surface light. Similarly thereto, the right decorative cover element 14R comprises an area 54R for right position light and an area 56R for a right surface light. The areas 54L, 54R for the left and right position light represent a left and right headlight (running light and/or low beams and/or high beams) of the vehicle. The areas 56L, 56R for the left or right surface light represent a radiator grill of the vehicle 10.

FIG. 1 shows an illustration of the vehicle 10 in which light sources contained in the respective cover element 14L, 14R or light sources interacting with the respective cover element 14L, 14R are switched off. Such a light situation corresponds to the cold appearance and can be present, for example, when the vehicle is stationary or in the case of a vehicle 10 having ignition switched off. In the cold appearance, the cover elements 14L, 14R can have a black appearance, for example. In contrast, FIG. 2 shows a situation of the vehicle 10 in which both the areas 54L, 54R for the left and right position light and the areas 56L, 56R for the left and right surface light are illuminated. By means of the position lights, the travel area or the surroundings are illuminated in a manner suitable for the driver. By means of the surface lights, the areas 56L, 56R are illuminated to generate a decorative effect and in particular to simulate an emblem and/or radiator grill.

As will be apparent from the following description, the illumination or through lighting of the respective areas 54L, 54R for the left and right position light and the areas 56L, 56R for the left and right surface light are implemented by a light source of the respective decorative cover element 14L, 14R or a light source interacting with the respective cover element 14L, 14R. An operating situation as shown in FIG. 2, in which a position light and a surface light are switched on, could be implemented, for example, in a driving state and/or for greeting. The familiar silhouette of a radiator grill results here for the observer when the position lights are switched on.

The construction of the cover elements 14L, 14R will be described hereinafter on the basis of two exemplary embodiments in FIGS. 3 and 4. Since the fundamental structure of the left decorative cover element 14L and the right decorative cover element 14R is identical, reference is only made hereinafter to one decorative cover element 14, wherein descriptions made for this purpose apply similarly to the left decorative cover element 14L and the right decorative cover element 14R.

The decorative cover element 14 (in short hereinafter: cover element) comprises a translucent element 16, which in the installed state forms an outer skin of the vehicle 10 and a safeguard for a headlight 12 arranged in the vehicle interior, a partially transparent element 18, and a light-guiding element 24, which are each constructed in multiple layers and are permanently connected to one another. All layers are transmissive for radar beams. The cover element 14 can thus also be installed in front of a radar 52. A radar beam area of the radar 52 is identified by the reference sign 52RS.

The translucent element 16 has a first transparent layer made of a first plastic, wherein a translucent first lacquer layer 28 is applied to an outer side of the transparent layer 26 facing toward the vehicle. The first transparent layer 26 and the translucent first lacquer layer 28 are materially bonded to one another.

The first lacquer layer 28 forms the outer skin of the cover element 14 and is a transparent lacquer layer. The first lacquer layer 28 is a multicomponent lacquer system, in particular a lacquer system based on polyurethane or siloxane. The first lacquer layer 28 is advantageously a so-called hard coating for headlights. The first lacquer layer 28 has a layer thickness between approximately 7 μm and approximately 0.7 mm. The first lacquer layer 28 has an index of refraction which corresponds to that of the first transparent layer 26.

The first transparent layer 26 is made of polycarbonate (PC) and has a thickness of approximately 3 mm. The index of refraction of the first transparent layer 26 is approximately 1.58. The shape of the first carrier layer 26 is adapted to the shaping of the vehicle body.

The translucent element 16 is materially bonded to the partially transparent element 18 on a side facing toward the vehicle interior. The partially transparent element 18 has translucent sections 20 and opaque sections 22, wherein the partially transparent element 18 has a second transparent layer 30, an opaque layer 32, and a third transparent layer 34. All layers of the partially transparent element 18 are materially bonded to one another.

Figure 3:
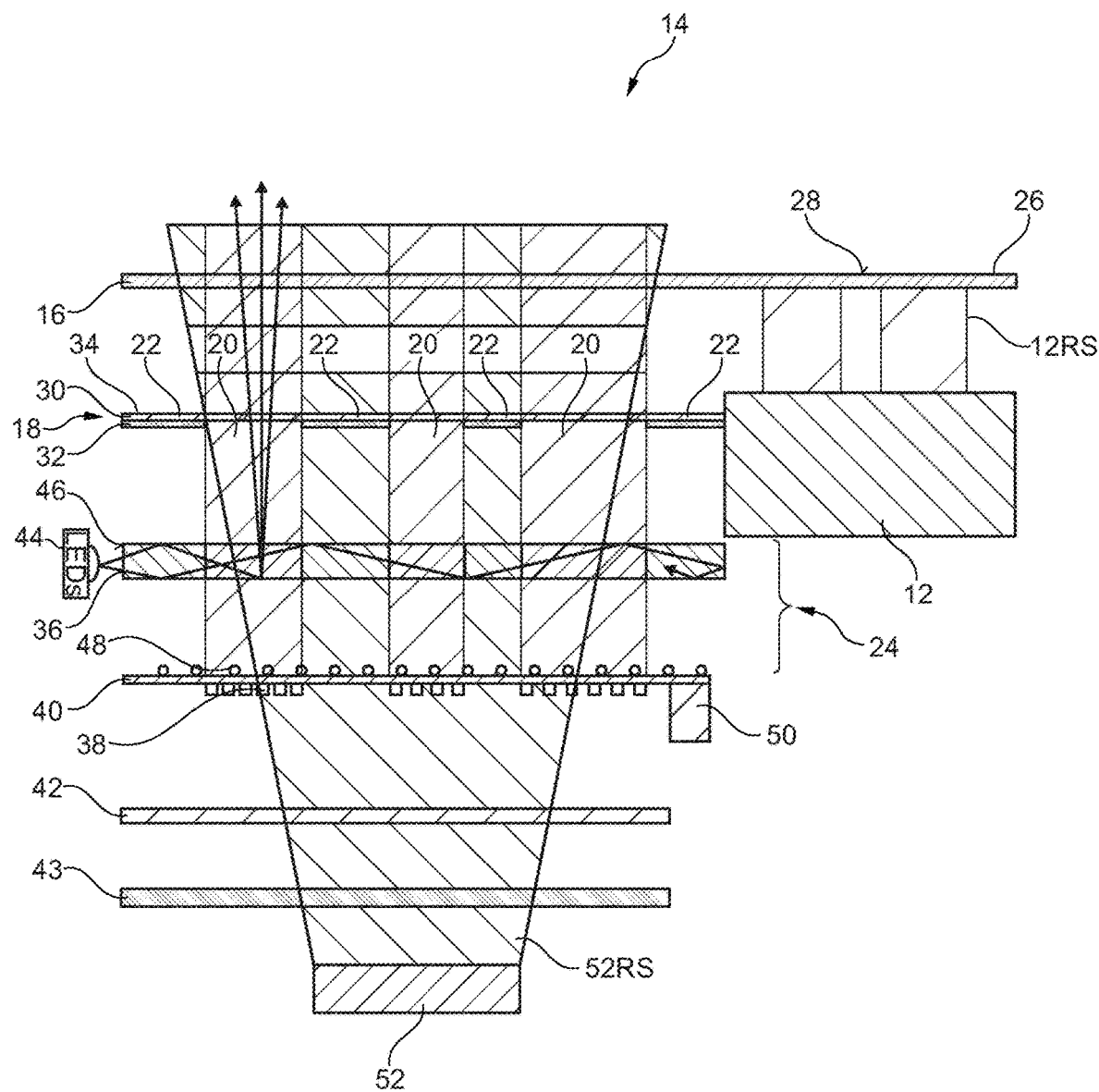
FIG. 3 shows a cross-sectional illustration through the layer structure of a cover element according to the disclosure.

The opaque layer 32 is applied according to the first exemplary embodiment in FIG. 3 to a side of the second transparent layer 30 facing toward the vehicle interior. The third transparent layer 34 is applied in the exemplary embodiment according to FIG. 3 to the second transparent layer 30 on a side facing toward the vehicle exterior. In the variant shown in FIG. 4, the opaque layer 32 is arranged on the side of the second transparent layer 30 facing toward the vehicle exterior. In contrast, the third transparent layer 34 is provided on the side of the second transparent layer 30 facing toward the vehicle interior.

The second transparent layer 30 represents a carrier layer made of polycarbonate (PC). It has an index of refraction which corresponds to the index of refraction of the first transparent layer and is thus approximately 1.58. The opaque layer 32 ensures that no light can pass through the second and the first transparent layer. The opaque layer 32 preferably does not contain any metallic or conductive components and advantageously has a layer thickness of approximately 12 μm. The opaque components can be attached or applied by printing, film application, or lacquering with subsequent laser processing. The opaque layer 32 is advantageously transmissive for radar beams, however.

The third transparent layer 34 preferably consists of PMMA or a lacquer and has low refractivity. This means the index of refraction is less than the index of refraction of the second transparent layer and is preferably approximately 1.4. The partially transparent element 18 having its layers can be provided as a semifinished product, in particular pre-molded and adapted to the shape of the translucent element 16.

Figure 4:
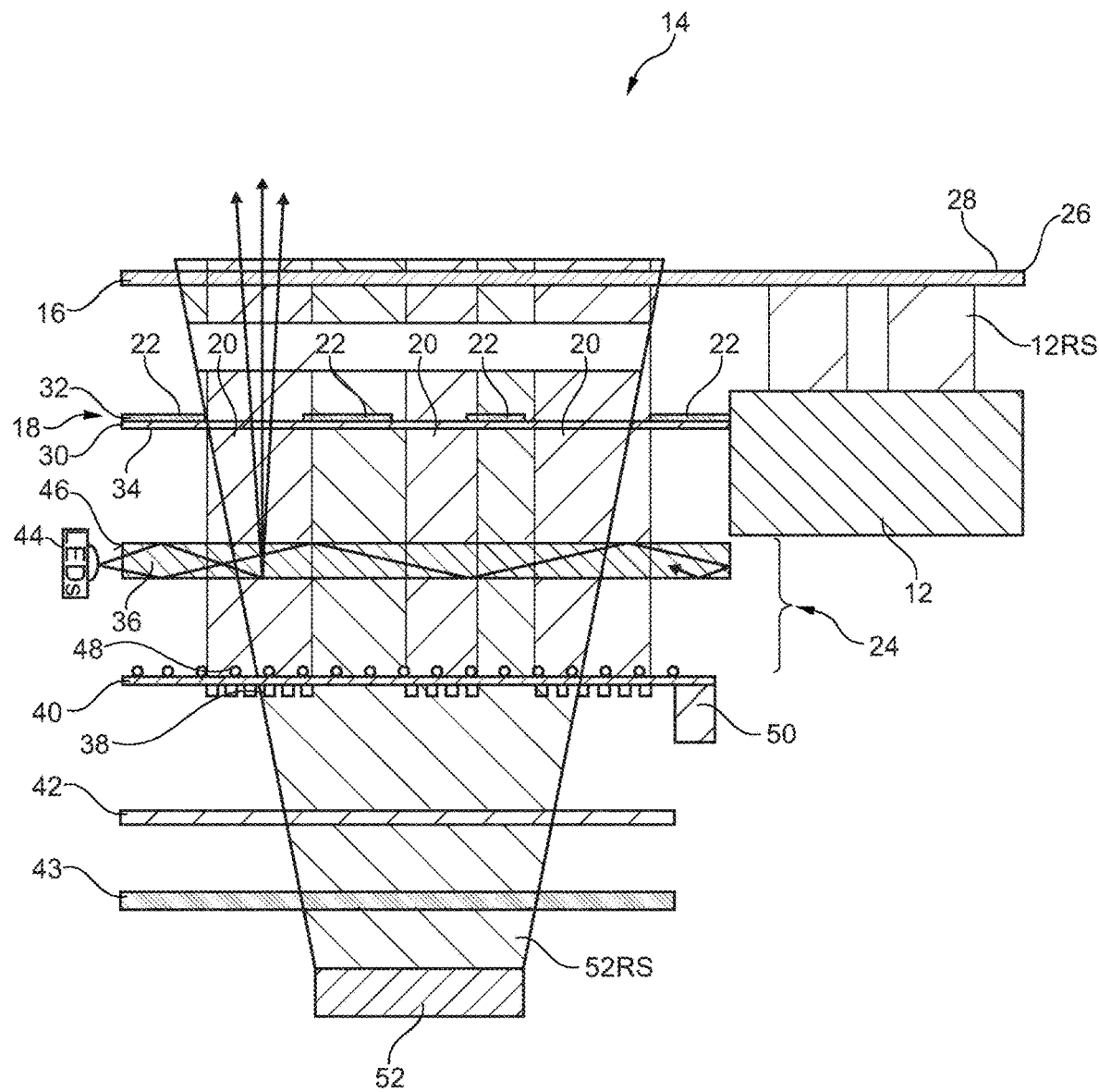
FIG. 4 shows a cross-sectional illustration through the layer structure of a cover element according to the disclosure.

As is furthermore apparent in FIGS. 3 and 4, the light-guiding element 24 has a light-guiding layer 36, a decoupling structure 38, a fourth transparent layer 40, and a second lacquer layer 42. In addition, a heating layer 48 and a plug connector 50 are optionally provided on a side of the fourth transparent layer 40 facing toward the vehicle interior. All layers and the decoupling structure as well as the heating layer 48 are materially bonded to one another.

The light-guiding layer 36 is used to decouple coupled-in light in the direction of the partially transparent element 18, in particular in the direction of the translucent sections 20. The light-guiding layer 36 has a thickness from approximately 2 mm to approximately 3 mm and an index of refraction of approximately 1.58.

Decoupling of light into the light-guiding layer 36 is carried out by means of a light source 44, which couples light via a coupling surface 46 into the light-guiding layer 36. The light source 44 is a light-emitting diode (LED) in the present case.

The decoupling structure 38 is arranged opposite to the translucent section 20, wherein the decoupling structure 38 is a spotted lacquer layer, which comprises white lacquer spots, for example, and which is applied to a surface of the light-guiding layer facing away from the partially transparent element 18. As is apparent from FIGS. 3 and 4, the decoupling structure 38 is applied to the fourth transparent layer 40 in the areas which are opposite to the translucent sections 20. The light coupled into the light-guiding layer 36 is thus initially reflected at the inner walls of the fourth transparent layer 40, and as soon as the light is incident on the decoupling structure 38, the light is decoupled in the direction of the partially transparent element 18, in particular in the direction of the translucent sections 28 and thus eliminates these areas.

The light-guiding layer 36 advantageously directly abuts the partially transparent element 18. The light-guiding layer 36 is advantageously transmissive for radar beams.

The fourth transparent layer 40 is used to keep the light guiding efficient in that the transparent layer 40 has an index of refraction which is less than the index of refraction of the light-guiding layer 36. The index of refraction of the fourth transparent layer 40 is advantageously approximately 1.35. The fourth transparent layer can be designated as a low index coating. The layer thickness of the fourth transparent layer 40 is advantageously between approximately 1 μm and approximately 5 μm. The fourth transparent layer 40 is advantageously transmissive for radar beams. The fourth transparent layer 40 can be a transparent protective lacquer layer, for example a polyurethane lacquer or siloxane lacquer.

The second lacquer layer 42 is formed as an impermeable protective lacquer, which faces toward the vehicle interior. The second lacquer layer advantageously has a layer thickness of approximately 30 μm. The second lacquer layer 42 is made of polyurethane or an epoxy. It preferably faces toward the vehicle interior. The second lacquer layer 42 is preferably also transmissive for radar beams.

The cover element 14 is distinguished in that the translucent element 16, the partially transparent element 18, and the light-guiding element 24 are materially bonded to one another, wherein their index of refraction is less than the indices of refraction of the third transparent layer 34 and the fourth transparent layer 40. Lossless decoupling of the light is thus enabled. In addition, all layers and materials used are transmissive for radar beams so that the cover element 14 can be used in front of the radar 52 of the vehicle 10.

One possibility for production is to provide the second transparent layer 30 with the third transparent layer 34 (low index coating) and the opaque layer 32. Optionally, the heating layer 48 and the plug connector 50 can also be provided on the second transparent layer 30. For this purpose, the mentioned layers are inserted into a multicomponent injection molding tool and overmolded with the first transparent layer 28. Subsequently, the semifinished product thus created is moved into a further cavity of the injection molding tool and, on the tool wall opposite to the injected semifinished product, the fourth transparent layer 40, which is provided in film form, having the second lacquer layer 42 (low index coating) and the decoupling structure 38 is inserted. The light-guiding element is subsequently injected by creating the light-guiding layer 36.

For the suitability as an exterior element, the component thus created is subsequently coated using a hard coating (first lacquer layer 28 on the side of the first transparent layer 26 facing toward the vehicle exterior). To protect from mechanical action from behind, a mechanical coating 43 is possible, but optional. The installation of the cover element 14 on the vehicle is carried out in place of the headlight and the radiator grill provided up to this point.

As can be inferred from FIGS. 3 and 4, the headlight 12 is provided adjacent to the layer sequence of the partially transparent element 18 and the light-guiding element 24. For reasons of space, the light emitted from the light source 44 is coupled into the coupling surface 46 on the end face of the light-guiding layer 36 opposite to the headlight 12.

In an alternative embodiment (not shown), the headlight could also be arranged behind the partially transparent element 18, wherein then no opaque sections 22 are provided in the area of the headlight beam area 12 RS.

Figure 5:
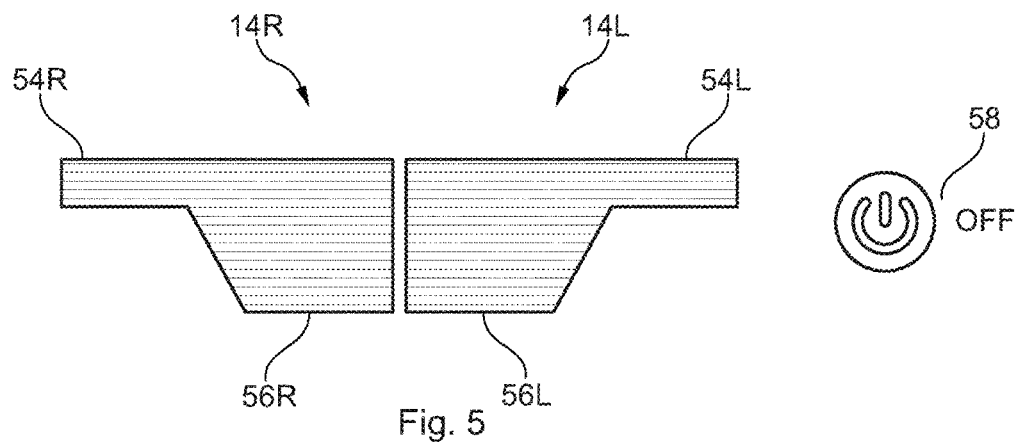
FIGS. 5 to 7 show the cover elements arranged on a vehicle in different operating modes.
Figure 6:
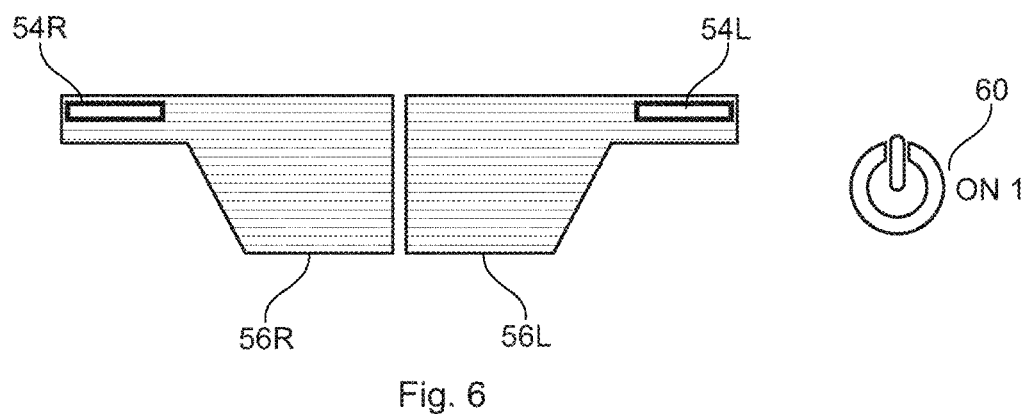
Figure 7:
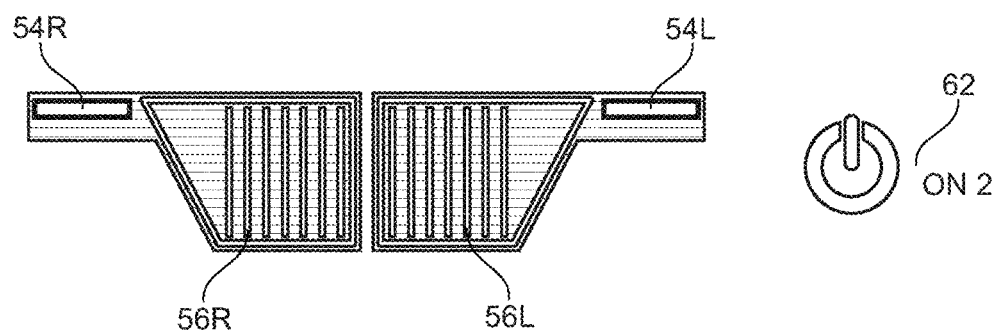

FIGS. 5 to 7 show different functional states of the left and right cover element 14L, 14R according to the disclosure, arranged on a vehicle (not shown). In FIG. 5, a first operating state 58 ("OFF") is shown here, in which the ignition of the vehicle is off and both the headlights 12 arranged in the areas 54L and 54R for the position light are switched off, as well as the light structure generating a surface light in the areas 56L, 56R for the left and right surface light.

FIG. 6 shows a second operating mode 60 ("ON 1"), in which the headlights 12 are switched on, due to which the areas 54L, 54R are lighted. In contrast, the areas 56L, 56R for the left and the right surface light are switched off, i.e., the light sources 44 are switched off.

FIG. 7 shows a third operating mode 62 ("ON 2"), in which in addition to the areas 54L, 54R for the position lights, the areas 56L, 56R for the left and the right surface light are also illuminated. In this case, a strip-shaped structure is created by the design of the translucent sections 20 and the opaque sections 22.

This can be used for staging, for example, of a greeting light, as will be described hereinafter with reference to FIGS. 8 to 11. For this purpose, the areas for the left and right surface light 56L, 56R are respectively divided into a first to third left surface area 64L, 66L, 68L and a first to third right surface area 64R, 66R, 68R, which are enclosed by a respective circumferential contour light 70L, 70R. Each of the mentioned surface areas 64L, 66L, 68L and 64R, 66R, 68R are preferably assigned separately activatable light-guiding elements 24 and light sources 44 in each case. In FIGS. 8 to 11, lighted surface areas are shown without pattern coloration, and surface areas which are not lighted or are weakly lighted are shown with shading. The smaller the distance between two adjacent shading lines, the less the light emission of the relevant surface area.

Figure 8:
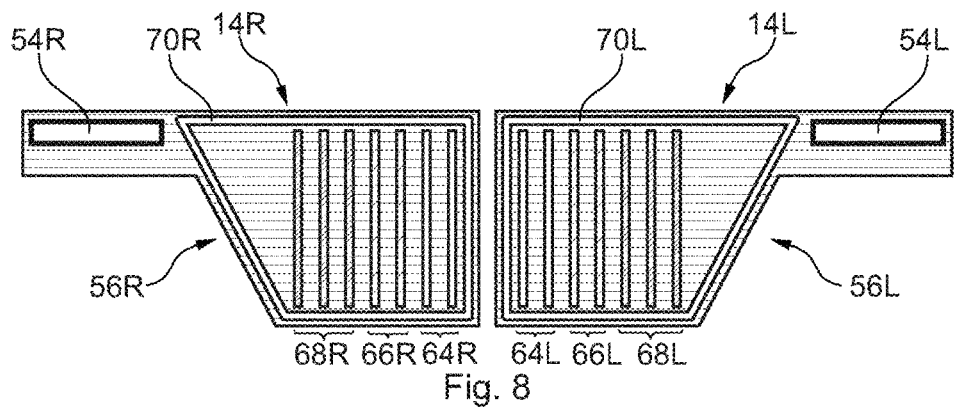
FIGS. 8 to 11 show the cover elements arranged in a vehicle, which represent the staging of different surface lights in chronological sequence.
Figure 9:
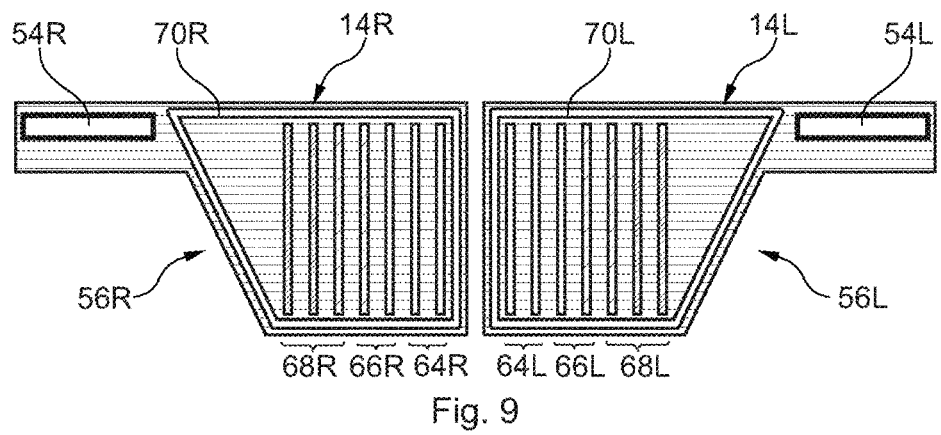
Figure 10:
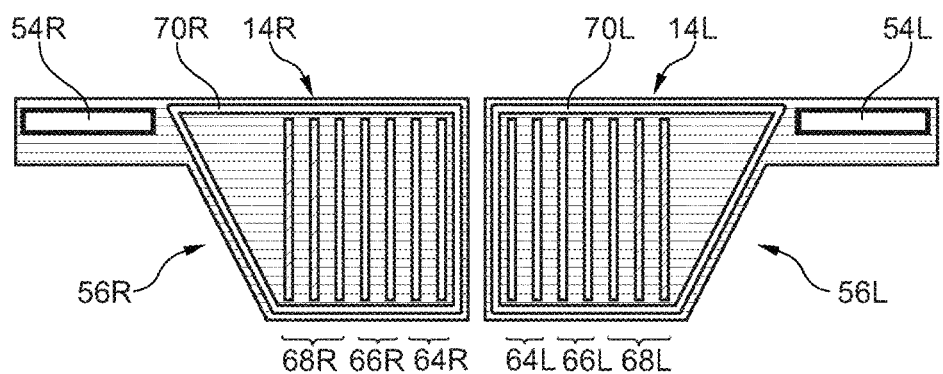
Figure 11:
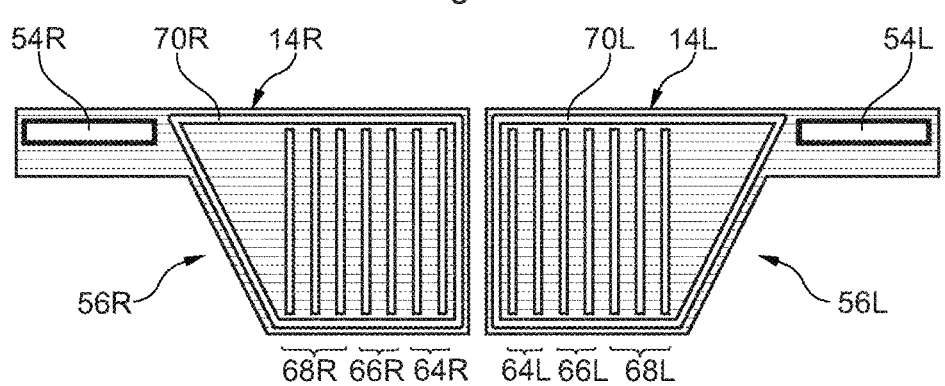

In this case, it can be seen, for example, that at a first point in time shown in FIG. 8, initially only the first left and right surface areas 64L, 64R are illuminated. In FIG. 9, at a point in time following FIG. 8, the second left and right surface area 66L, 66R are additionally illuminated. The light intensity of the first left and right surface areas can be further increased here. In FIG. 10, at a point in time following FIG. 9, the light intensities of the second left and right surface areas 66L, 66R are increased. In FIG. 11, at a point in time following FIG. 10, finally the third left and right surface area 68L, 68R are also illuminated, due to which the light output of all surface areas is finally identical at the end of the staging.

LIST OF REFERENCE SIGNS 10 vehicle
12 headlight
12RS headlight beam area
14 decorative cover element
16 translucent element
18 partially transparent element
20 translucent sections
22 opaque sections
24 light-guiding element
26 first transparent layer
28 first lacquer layer
30 second transparent layer
32 opaque layer
34 third transparent layer
36 light-guiding layer
38 decoupling structure
40 fourth transparent layer
42 second lacquer layer
43 black coating
44 light source
46 coupling surface
48 heating layer
50 plug connector
52 radar
52RS radar beam area
54L area for left position light
54R area for right position light
56L area for left surface light
56R area for right surface light
58 first operating mode (OFF)
60 second operating mode (ON 1)
62 third operating mode (ON 2)
64L first left surface area
66L second left surface area
68L third left surface area
64R first right surface area
66R second right surface area
68R third right surface area
70L circumferential contour light of the left surface light
70R circumferential contour light of the right surface light

The invention claimed is:

1. A decorative cover element for a headlight of a vehicle, comprising:
    a translucent element, which in the installed state forms an outer skin of the vehicle and a safeguard for the headlight;
    a partially transparent element, which has translucent sections and opaque sections; and
    a light-guiding element, which is designed to decouple coupled-in light at least in sections in the direction of the translucent element, wherein
        the partially transparent element is arranged between the translucent element and the light-guiding element, and
        in the installed state the translucent sections and the opaque sections of the partially transparent element are at least partially arranged adjacent to the headlight.

2. The cover element according to claim 1, wherein the translucent element, the partially transparent element, and the light-guiding element are provided as an inseparable layer composite.

3. The cover element according to claim 2, wherein the translucent element, the partially transparent element, and the light-guiding element are transmissive for radar beams.

4. The cover element according to claim 3, wherein the translucent element has a first transparent layer made of a first plastic.

5. The cover element according to claim 4, wherein the translucent element has a translucent first lacquer layer, which is arranged on a surface of the translucent element facing away from the partially transparent element.

6. The cover element according to claim 5, wherein the partially transparent element has a second transparent layer made of a second plastic.

7. The cover element according to claim 6, wherein the partially transparent element has an opaque layer, which is arranged at least in sections on a surface of the partially transparent element facing toward the translucent element and which forms the opaque sections.

8. The cover element according to claim 7, wherein the partially transparent element has an opaque layer, which is arranged at least in sections on a surface of the partially transparent element facing away from the translucent element, which the light-guiding element adjoins and which forms the opaque sections.

9. The cover element according to claim 8, wherein the partially transparent element has a third transparent layer made of a third plastic, which is arranged on a surface of the second transparent layer of the partially transparent element facing away from the translucent element.

10. The cover element according to claim 9, wherein the light-guiding element has a light-guiding layer.

11. The cover element according to claim 10, wherein the light-guiding element has a decoupling structure on a surface facing away from the partially transparent element.

12. The cover element according to claim 11, wherein the light-guiding element has a fourth transparent layer made of a fourth plastic, which adjoins the decoupling structure.

13. The cover element according to claim 12, wherein the light-guiding element has a second lacquer layer, which is arranged on a surface of the fourth transparent layer facing away from the light-guiding layer.

14. The cover element according to claim 13, further comprising an electrically conductive heating layer that is contacted by a plug connection and that is applied to the second transparent layer of the partially transparent element or to the fourth transparent layer of the light-guiding element.

15. The cover element according to claim 14, wherein the installed state the headlight adjoins the first transparent layer of the translucent element.

16. The cover element according to claim 15, wherein the installed state the headlight adjoins the fourth transparent layer of the light-guiding element.

17. A vehicle having a cover element according to claim 16.

* * * * *